United States Patent
Eurlings et al.

(10) Patent No.: US 8,128,829 B2
(45) Date of Patent: Mar. 6, 2012

(54) CROSS FLOW FILTER DEVICE

(75) Inventors: Martin Eurlings, Bilzen (BE); Philippe Albert, Theux (BE); Stefan Vandendijk, Tongeren (BE)

(73) Assignees: Bekaert Advanced Filtration, Sprimont (BE); Martin Eurlings, Bilzen (BE)

( * ) Notice: Subject to any disclaimer, the term of this patent is extended or adjusted under 35 U.S.C. 154(b) by 0 days.

(21) Appl. No.: 13/067,458

(22) Filed: Jun. 2, 2011

(65) Prior Publication Data

US 2011/0233151 A1    Sep. 29, 2011

Related U.S. Application Data

(63) Continuation of application No. 11/666,150, filed on Apr. 24, 2007, now abandoned.

(30) Foreign Application Priority Data

Oct. 27, 2004    (EP) ..................................... 04077963

(51) Int. Cl.
*B01D 37/00* (2006.01)
*B01D 61/00* (2006.01)
*B01D 29/62* (2006.01)
*B01D 35/22* (2006.01)
*B01D 17/12* (2006.01)
*B01D 35/00* (2006.01)

(52) U.S. Cl. ........ 210/767; 210/798; 210/791; 210/805; 210/806; 210/256; 210/315; 210/314; 210/337; 210/338; 210/342; 95/278; 95/286

(58) Field of Classification Search .................... None
See application file for complete search history.

(56) References Cited

U.S. PATENT DOCUMENTS 2,914,456 A * 11/1959 Moore et al. ................... 208/38

* cited by examiner

*Primary Examiner* — Benjamin Kurtz
(74) *Attorney, Agent, or Firm* — Dykema Gossett PLLC (57) ABSTRACT

Cross flow filter device comprising a longitudinal first filter element (1) having a first width (w1) and a longitudinal central axis (8), a longitudinal second filter element (2) having a second width (w2) and being longitudinally installed substantially concentrically inside said first filter element (1), a housing (3) surrounding said first filter element (1), said cross flow filter device having respectively a raw material inlet (4), a concentrate outlet (5), and a first filtrate outlet (6) connected to said first filter element (1). The ratio between the second width (w2) and the first width (w1) is 65%, preferably at least 70% and more preferably about 75%.

24 Claims, 7 Drawing Sheets

CROSS FLOW FILTER DEVICE

The present invention relates to a cross flow filter device provided for filtering a raw material comprising particles in a medium, said cross flow filter device comprising:
- a longitudinal first filter element having a first width and a longitudinal central axis,
- a longitudinal second filter element having a second width, smaller than said first width, and being longitudinally installed substantially concentrically inside said first filter element,
- a housing surrounding said first filter element, said cross flow filter device having respectively a raw material inlet, a concentrate outlet provided to exit a concentrate being said raw material substantially enriched in particles, and a first filtrate outlet provided to exit a filtrate being said medium substantially depleted in particles, said filtrate outlet being connected to said first filter element.

In the art of filter devices, several types of filter devices are known. The two major types of filter devices are the dead end filter device and the cross flow filter device.

Traditionally, filter devices are used to filter a raw material comprising particles in suspension in a medium which can be liquid or gaseous. After filtration, or ultrafiltration, depending of the cut-off of the filter elements, and as aforementioned, a filtrate being the raw material depleted in particles, a concentrate being the raw material enriched in particles are both obtained. Depending on the application, the product of interest is either the filtrate or the concentrate.

The most important difference between these two types of filter devices, is as follows:
- the dead end filter device comprises a raw material inlet and a filtrate outlet, the concentrate being generally maintained inside the device,
- the cross flow filter device comprises a raw material inlet, a filtrate outlet and a concentrate outlet.

A dead end filter device is for example known from DE 38 05 361 which discloses several embodiments of the dead end filter device. The device according to DE 38 05 361 comprises for example two or more concentric filter elements, an external compartment being between the housing of the device and the most external filter element and a central compartment, being inside the most internal concentric filter elements. The device also comprises a raw material inlet and a filtrate outlet. The raw material inlet is in direct communication with the external compartment and the filtrate outlet is in direct communication with the central compartment. The filter elements are provided for retaining particles with a predetermined particle size and to allow the passage of the particles which present a particle size smaller than the predetermined particle size through the filter element. Therefore, the raw material comprising particles in suspension in a medium enters the filter device in the external compartment, the particles having a particle size greater than the predetermined particle size are retained upstream and the medium with the particles having a particle size smaller than the predetermined particle size passes through the filter element. The same applies to all concentric filter elements.

Thus, the particles having a size greater than the predetermined particle size of the filter element downstream and a size smaller than the predetermined particle size of the filter element upstream are retained between two filter elements. Further, the filter device comprises a cleaning device to harvest or to remove the concentrate and the particles being retained between each filter element.

The cross flow filter devices always comprise a concentrate outlet to harvest or to remove the concentrate and the particles. But generally, a cleaning device is still needed because of particle deposition and clogging of the filter element.

Such a cross-flow filter device of claim 1, is known, for example, from DE 197 03 877, which describes an assembly to clean a filter membrane of a cross flow filter. A layer of sedimentary deposits is rinsed off by fluid directed at the deposits from a nozzle a short distance away. In the filter device according to DE 197 03 877, there is a concentric positioning of multiple filter membranes with sufficient space between the membranes for having inside cleaning nozzles that clean the surface of the filter media like a jet washer.

Generally, and as it is the case in DE 197 03 877 (see drawings), the ratio between the second and the first filter membrane width is around 0.55.

Unfortunately, such a cross flow filter device is very difficult to manufacture and to operate and does not prevent or reduce the accumulation of sediments at the surfaces of the filter element.

It is an object of the invention to palliate at least some of these drawbacks by providing a cross flow filter device which is easy to manufacture, easy to carry out while providing better performance by improving the filtration effect due to a reduction of the membrane clogging and particle deposition and an increase of the filtration surface of a given space requirement.

To this end, the invention provides a cross flow filter device according to the preamble of claim 1, characterised in that the ratio between the second width and the first width is 65%, preferably at least 70% and more preferably about 75%.

It has been surprisingly found that the ratio between the second width and the first width of at least 65% substantially reduced the clogging and the particle deposition. Indeed, the presence of such a little space between the two filter elements involves an increased velocity for raw material while substantially reducing or preventing particle deposition or membrane clogging. Indeed at a constant flow rate of the raw material, if the space between the two filter elements is reduced, the velocity of the raw material will increase. Thus it is desirable to reduce the space between the two filter elements by adjusting the ratio between the second width and the first width to at least 65%, preferably to least 70% and more preferably to about 75% to reduce or prevent permanent particle deposition and membrane clogging without requiring any cleaning device between the two filter elements (like jet washers, scrapers or the like).

Preferably, the ratio between the second width and the first width is at most 95% for allowing a predetermined flow rate of the raw material and to avoid an overpressure effect at the raw material inlet.

Another advantage of the device according to the invention is that the first filter element and the second filter element are two separate filter elements having each their own filtrate outlet being different from each other, the filtrate outlet of the first filter element being said first filtrate outlet and the filtrate outlet of the second filter element being a second filtrate outlet.

With two different filtrate outlets, the device according to the invention is a more flexible device allowing to use the device with only one filter element when required by blanking the outlet of the concerned filter element, for example, when the concerned filter element is accidentally perforated.

Advantageously, the raw material inlet and the concentrate outlet are substantially aligned, in particular, aligned with said longitudinal central axis.

It is advantageous that the raw material inlet and the concentrate outlet are aligned with the longitudinal central axis as this is the direction of the raw material flow. Such configuration allows the flow to remain a substantially laminar flow without substantial perturbation and the raw material (concentrate) passes with a higher efficiency tangentially to the surface of the filter element.

In a particular embodiment, the first and the second filtrate outlets are respectively prolonged by a first and a second nozzle which are ended respectively by a first and a second valves, each valve having at least an open position and a closed position and being separately controlled.

This is also a characteristic which allows a more flexible device as mentioned before. When the filtrate outlets present a nozzle ended by a valve, when it is required, it is possible, to blank an outlet. One valve being optionally controlled independently from the other or both valve being controlled together. Moreover, one filter element can be in operation while the other could be in a cleaning cycle. Indeed, by having two concentric filter elements, they present different diameters implying that the surface of the first filter element is different than the surface of the second element and the two filter elements should then be in a cleaning cycle at different moment. Indeed, with two different surfaces, since each filter element can manage a certain quantity of particles, they do not necessarily need to be cleaned at the same moment.

Preferably, each filter element comprises a filter media, each filter media of each filter element having its own cut-off, said cut-off of the filter media of the first filter element being substantially different or similar from said cut-off of the filter media of the second filter element.

The device according to the invention allows to collect two qualities of filtrates as the cut-off of the first filter media can be different of the second filter media. The device according to the invention comprises in an advantageous embodiment, two independent filtrate outlets allowing to collect the two filtrates with respectively their own qualities.

It can be preferred to have, depending on the application to which the device is dedicated, the same cut-off for the two filter elements.

Moreover, each filter media being manufactured in a material selected in the group consisting of metallic material, organic material or inorganic material.

The material of the filter media can be the same for the two filter elements or different, such material is chosen according to the chemical and physical properties of the raw material, to the compatibility or incompatibility between the raw material and the filter media and also according to the porosity. The yield of the device for a given application is also taken into account for the choice of the materiel forming the filter media.

The device according to the invention comprises, advantageously, a circulation pump which is provided between the concentrate outlet and the raw material inlet.

There could be a tank downstream and upstream to store raw material respectively not passed and passed one time through the filtration device, but advantageously, the raw material is recirculated through the device either to concentrate the raw material or to reduce losses, namely if what should be collected is very small particles passing through the filtration media, and having to be removed from the raw material, as explained in more details hereinafter.

Moreover, in a particular embodiment, a back-flush device is provided comprising:
an expansion vessel, having a first port and a second port, identical or different from said first port,
a third nozzle connected to said first port of the expansion vessel and to said first nozzle between the first filtrate outlet and the first valve, and
a fourth nozzle connected to said second port of the expansion vessel and said to said second nozzle between the second filtrate outlet and the second valve.

Generally, most common back-flush device comprises a buffer vessel with filtrate which is pressurised with compressed air or another gas or a pump situated after the filter elements that pumps the filtrate back in reverse direction.

Common back-flush device using pressurisation are discontinuous device which does not allow a continuous process to be carried out therein, they are complicated and require an heavy maintenance.

Here, the invention comprises an expansion vessel which does not need any pressurised gas nor additional pump at the filtrate outlet so the design and the maintenance of the system is simplified.

In a particularly advantageous embodiment, the third nozzles comprises a third valve and the fourth nozzle comprises a fourth valve, said third and said fourth valves having each at least an open position and a closed position and being separately controlled.

When the third valve is in open position, the filtrate normally collected by the first nozzle can fill the expansion vessel. When the fourth valve is in open position, the filtrate normally collected by the second nozzle can fill the expansion vessel. The third and the fourth valves are separately controlled, so it could be the third or the fourth or both which are in open position. When the level of filtrate in the expansion vessel is sufficient, the valves (third, fourth or both) in open position have to be closed. When the surface of the first or the second filter element is clogged or shows deposits, respectively the third or the fourth valve, will be opened to clean the surface of the filter element.

Because the expansion vessel is connected to the two filtrate outlets, and because the valves are separately controlled, when a surface has to be cleaned, the first filter element of the cross flow filter device can be in a cleaning cycle when the second is in use or inversely.

Moreover, the concentrate outlet is ended by a valve, in particular by a throttle valve. The valve of the concentrate outlet allow to transform the cross flow filter device into a dead end device by simply closing the throttle valve. Moreover, the throttle valve allows to build up pressure as the expansion vessel is pressurised using the filtrate flow. The pressure of the filtrate flow is increased by throttling the raw material concentrate so that the pressure in the filter module is built up. This pressure will go through the filter element to the filtrate side of the module and thus, it is possible to use this pressure to pressurise the expansion vessel.

Once the expansion vessel has reached its maximal pressure, the third and the fourth valves were closed and the throttle valve is opened so that the cross flow effect is recovered in the cross flow filtration device according to the invention.

Other embodiments of the filtration device according to the invention are mentioned in the annexed claims.

Other characteristics and advantages of the invention will appear more clearly in the light of the following description of a particular non-limiting embodiment of the invention, while referring to the figures.

In the drawings, a same reference sign has been allotted to a same or analogous element of the cross flow filtration device according to the invention.

Figure 1:
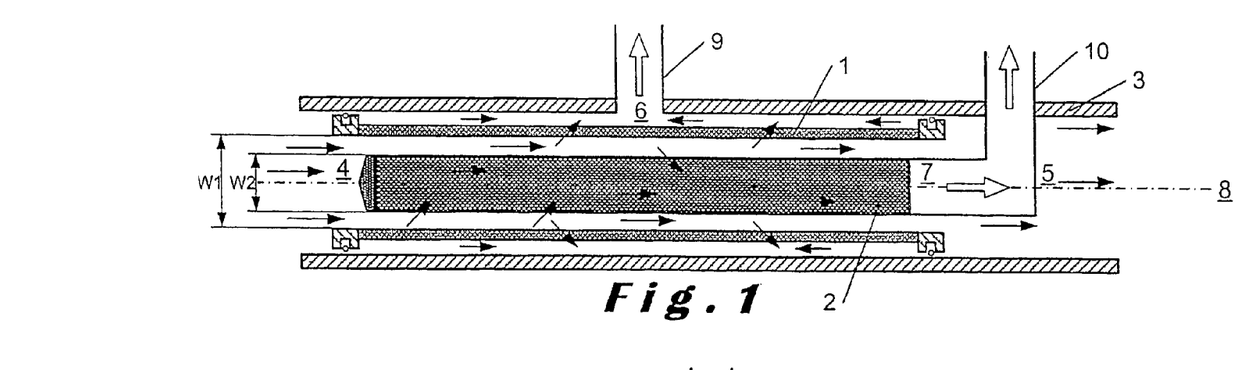
FIG. 1 is a cross section of the cross flow filter device according to the invention

In FIG. 1, it can be seen that the device according to the invention comprises a longitudinal first filter element 1 and a longitudinal second filter element 2 installed substantially concentrically inside the first filter element 1. The cross flow filter device also comprises a housing 3 surrounding the first filter element 1, a raw material inlet 4, a concentrate outlet 5, and a first filtrate outlet 6 connected to the first filter element 1. As shown, the raw material inlet 4 and the concentrate outlet 5 are preferably substantially aligned, in particular, aligned with said longitudinal central axis 8. In this preferred embodiment, the second filter element 2 is connected to its own filtrate outlet called the second filtrate outlet 7.

Each filter element 1,2 comprises a filter media having its own cut-off. The cut-off of the filter media of the first filter element 1 can be substantially similar or different from said cut-off of the filter media of the second filter element 2. For example, the cut-off of the first filter media can range from 500 to 0.1 μm, preferably from 100 to 1 μm.

The filter media can be manufactured, for example, in a material selected in the group consisting in metallic material, organic material or inorganic material. Exemplary materials are stainless steel, ceramics, polyethersulfone, polypropylene and the like.

Figure 2:
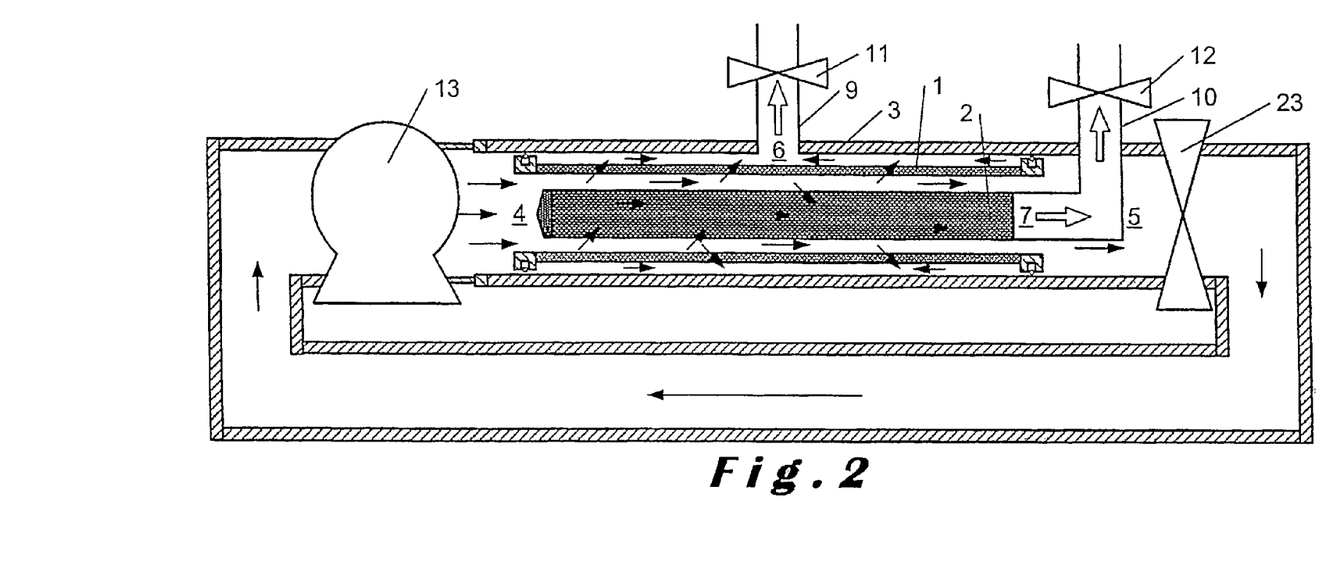
FIG. 2 is a cross section of the cross flow filter device according to the invention further comprising a circulation pump, outlet valves and inlet valves.

As illustrated in FIG. 2, the first 6 and the second filtrate outlets 7 are respectively extended by a first 9 and a second nozzle 10. The first nozzle 9 is ended by a first valve 11 and the second nozzle 10 is ended by a second valve 12.

Moreover, in a preferred embodiment, a circulation pump 13 is provided between the concentrate outlet 5 and the raw material inlet 4.

The raw material to be filtered is pumped from a process plant or from a raw material tank to the cross flow filter device.

It should be intended that it can be the circulation pump 13 or another pump which supplies the raw material to be filtered to the cross flow filter device. Indeed, the circulation pump 13 can make the connection between the raw material tank and the concentrate outlet 5 before supplying a mixture of the raw material and of the concentrate at the inlet 4 of the cross flow filter device.

According to the invention, the raw material inlet or the mixture aforementioned is supplied tangentially to the filter media surface of the filter element as it is indicated by arrows.

The first filter element has a first width w1 and the second filter element has a second width w2. The first width w1 is the inner width of the first filter, whereas the second width is the outer width of the second filter. To improve the performance of the cross flow filtration device, the ratio between the second width and the first width is 65%, preferably at least 70% and more preferably about 75%.

With such values, the cleaning effect of the surfaces of both filter elements by the raw material flow is increased. Indeed, by reducing the volume easily accessible for the raw material into the cross flow filter device, the inside pressure is increased. (Bernoulli: P.V=constant).

Therefore, as the raw material inlet flow rate is defined by the circulation pump, it is relatively constant and with respect to what was said before, the velocity of the raw material is increased. As a consequence, high cross flow velocity tangentially to the filter media surface reduces or prevents a permanent particle deposition and thus a clogging of membranes pores.

In a similar way, the ratio between w2 and w1 is preferably at most 95% in order to allow the raw material to enter in the cross flow filter device according to the invention at an appropriate flow rate. This ratio also avoids an overpressure at the raw material inlet.

In this particularly preferred embodiment, the second filter element 2 is connected to its own filtrate outlet called the second filtrate outlet 7. The second filtrate outlet 7 is connected to a second nozzle 10 and the second nozzle 10 comprises a second valve 12. The first filtrate outlet 6 is also connected to a first nozzle 9 and comprises a first valve 11. Both valves 11,12 are preferably separately controlled allowing to operate the two filter elements 1,2 independently. The first filter element 1 can be in a cleaning cycle when the second 2 is in filtration operation.

It should be understood that the alignment of the raw material inlet 4 and the concentrate outlet 5 is important as it contributes to tangentially apply the raw material flow to the filter media surface without causing turbulence which can damage the rather inside laminar flow.

The maximal value of the ratio of 95% also enables to avoid turbulences in the raw material flow.

Preferably, the two filter elements 1,2 have the same removal efficiency by having a similar cut-off. But when two different qualities of products are needed, it can be advantageous to have a different cut-off for the filter media on each filter element.

The first 11 and the second valves 12 of the filtrate outlets 6, 7 can be directly connected by nozzles to another process plant for immediate use or to one or two filtrate tanks for storage. If the filter media of the filter elements are similar, the filtrate outlets of the cross flow filter device according to the invention can be connected to one or two filtrate tanks to store the filtrate. If the cut-off is different for the two filter media, it should be understood that two different tanks should be provided to store the two different filtrates as the quality and the composition is not the same.

In summary, by the presence of the second filter element 2, the filter surface in the filtration device is increased. This latter acts as a reducer, increasing the velocity of the raw material in the filtration device and thus improving the cleaning effect of the tangential flow over the filter media, resulting in longer operating cycles before cleaning procedures. Moreover, the two filter elements 1,2 can be operated individually allowing a continuous operation of the filtration device.

Exemplary values for dimensions of the elements of the cross flow filter device are as stated in the following table (Table 1).

TABLE 1

| | |
|---|---|
| Inner volume of the first filter element | 453 cm³ |
| Outer volume of the second filter element | 245 cm³ |
| Volume between both filter elements | 208 cm³ |
| Width w1 of the first filter element | 33 mm |
| Width w2 of the second filter element | 25 mm |
| Number of times the velocity increased | 2.17 times |

When in service, the raw material is fed by the circulation pump 13 through the raw material inlet 4 into the space between the two filter element 1,2. Depending on the cut-off of the filter media of the filter elements 1,2, the fluid (liquid or gas) passes through the filter elements 1,2, which fluid contains several particles which are smaller than the size of the filter media pores. Greater particles remain into the space between both filter element 1,2. A portion of the particles will be deposited upon the surface of the filter media and the other portion will be carried away by the flow. This is the reason why the outlet of raw material is called concentrate outlet 5 as the fluid is enriched with particles.

The fluid which has passed through the filter elements 1,2 exits via the first 6 and the second filtrate outlet 7 and is either directed to another process plant or to a filtrate tank.

Figure 3:
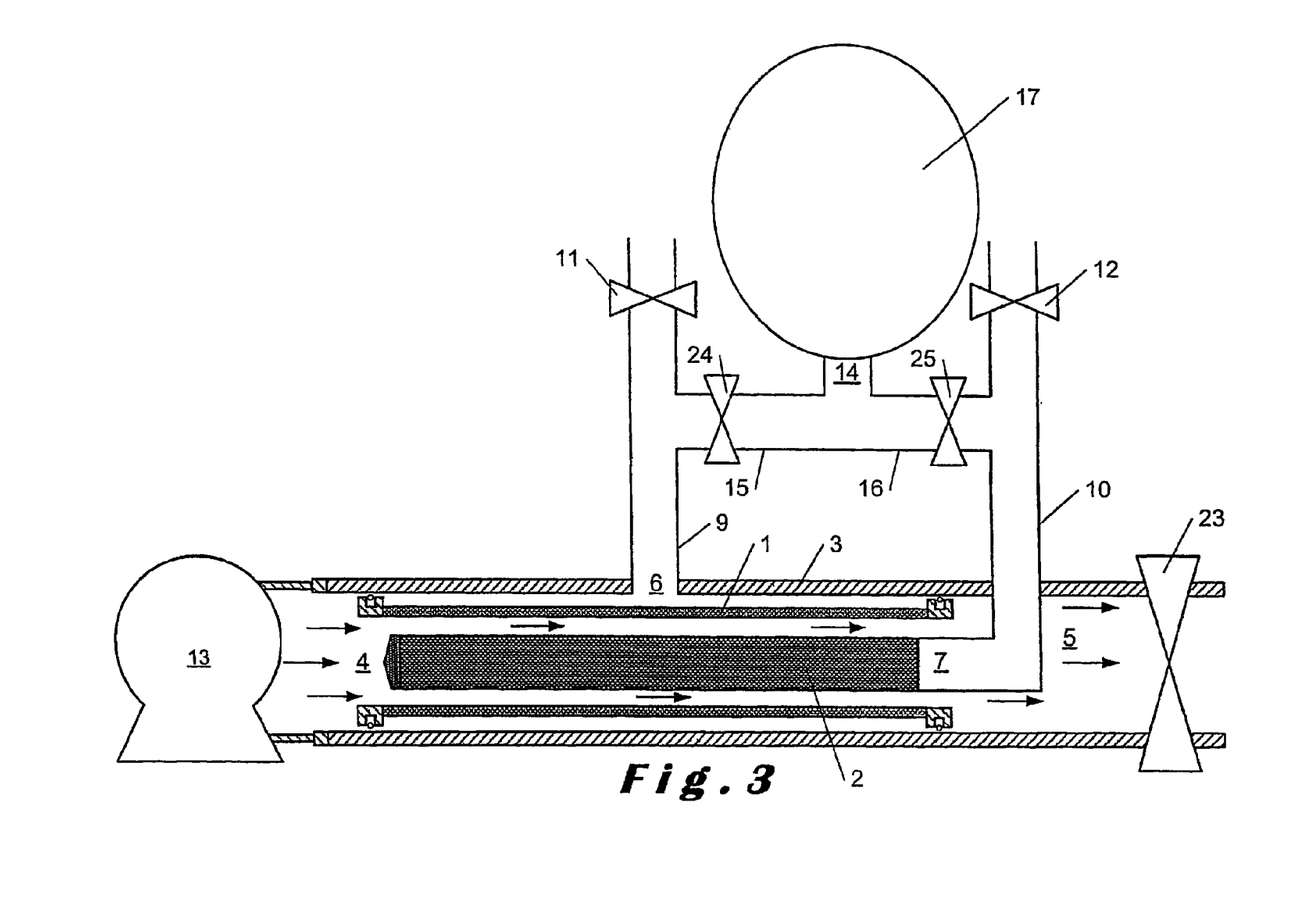
FIG. 3 is a cross section of the cross flow filter device according to the invention integrated in a filtration device further comprising a back-flush device, a circulation pump and a concentrate outlet throttle valve.

FIG. 3 shows a cross section of the cross flow filter device according to the invention integrated in a filtration device further comprising a back-flush device. The back-flush device comprises an expansion vessel 17 having a first port 14 (inlet) which is also the second port (outlet). A third nozzle 15 is connected to the first port 14 of the expansion vessel 17 and to said first nozzle 9 between the first filtrate outlet 6 and the first valve 11, and a fourth nozzle 16 is connected to the port 14 of the expansion vessel 17 and to the second nozzle 10 between the second filtrate outlet 7 and the second valve 12.

The third nozzle 15 comprises a third valve 24 between the first nozzle 9 and the port 14 of the expansion vessel. The fourth nozzle 16 comprises a fourth valve 25 between the second nozzle 10 and the port 14.

The first 11 and the second valves 12 of the filtrate outlets 6, 7 can be directly connected by nozzles to another process plant for immediate use or to one or two filtrate tanks for storage.

As aforementioned, the raw material to be filtered is fed by a circulation pump 13 from a process plant or from a raw material tank to the filtration device.

As also explained before, it should be intended that it can be the circulation pump 13 or another pump which supplies the raw material to be filtered to the filtration device. Indeed, the circulation pump 13 can make the connection between the raw material tank and the concentrate outlet 5 before supplying a mixture of the raw material and of the concentrate at the inlet 4 of the filtration device.

Moreover, the concentrate outlet 5 is ended by a fifth valve 23, being in particular a throttle valve. The throttle valve is provided to regulate the flow rate of the concentrate by throttling this later.

Figure 4A:
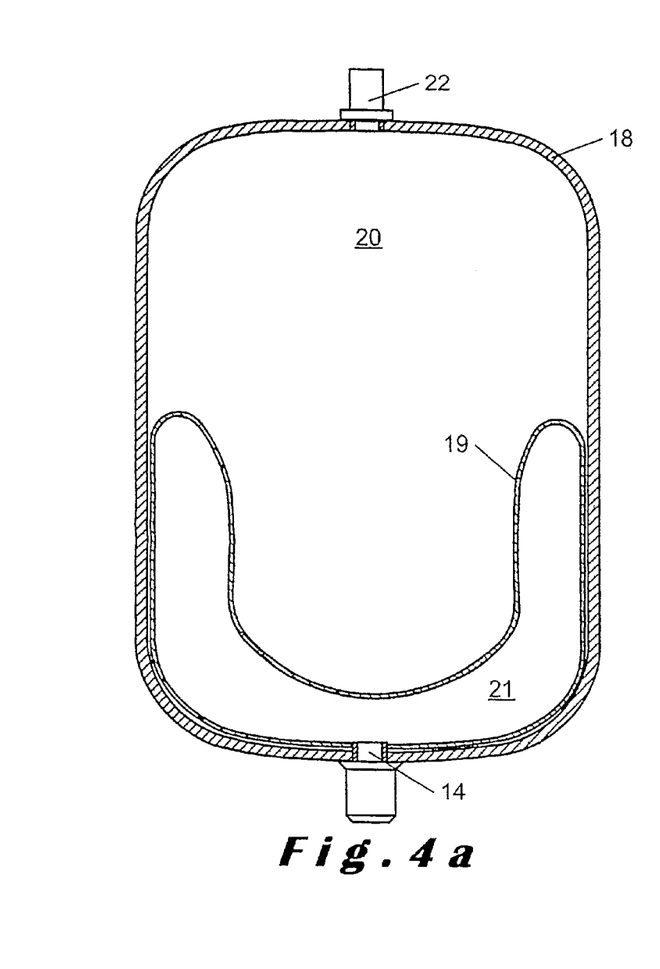
FIG. 4a is a cross section of the expansion vessel of the back-flush device of the filtration device without filtrate and 4b is the same representation of the expansion vessel but full of filtrate.
Figure 4B:
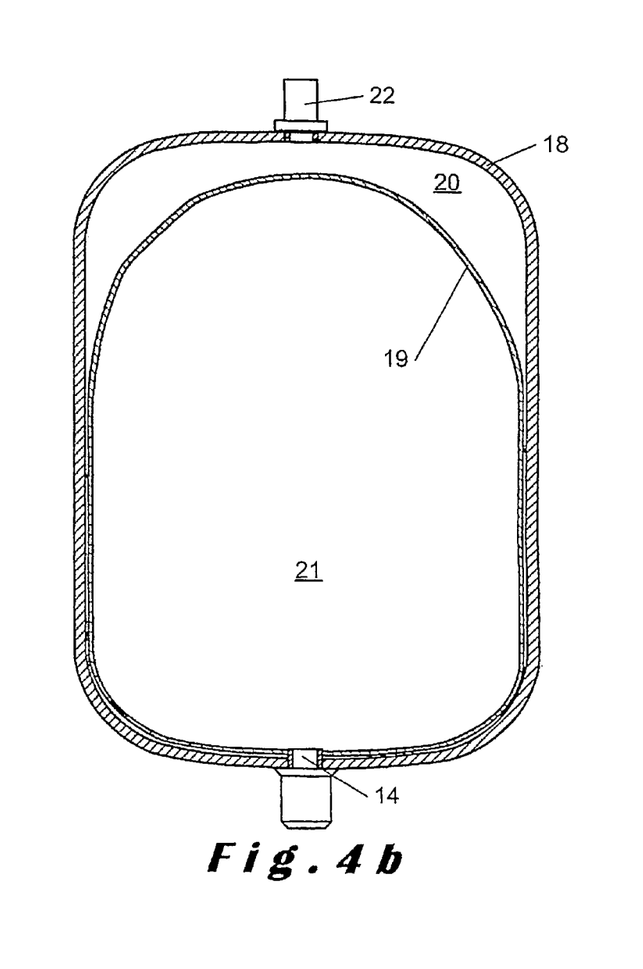

FIG. 4 shows details of the expansion vessel of the back-flush device according to the invention which can be used in the filtration device.

FIG. 4a shows the expansion vessel without filtrate and 4b is the same representation of the expansion vessel but full of filtrate. The expansion vessel is, in particular, an expansion vessel similar to those used in heating systems.

The expansion vessel comprises a housing 18, preferably made of stainless steel, a diaphragm 19 dividing the vessel in two parts, an external first part 20 provided to contain a gas (being in fact contained out of the diaphragm 19 and within the housing 18) and a internal second part 21 provided to contain a liquid (being the interior of the diaphragm 19). The diaphragm 19 is preferably interchangeable and made of butyl rubber. The material used to manufacture the expansion vessel housing 18 can be any material but preference is given to stainless steel because all component that are not made of this material can be damaged by salt or other substances that may optionally be contained in filtrate or in air.

Also the diaphragm 19 can be made of any material well known by those skilled in the art, but butyl rubber is preferred for its elasticity, resistance and neutrality. It should be understood that preferably, the material either for the expansion vessel housing 18 or the diaphragm 19 are chosen to not interact with liquid or gas that will be contained into the expansion vessel 17.

In this particular embodiment, the expansion vessel further comprises a single port 14 as inlet and outlet for filtrate since valves are present to impose the sense of the filtrate (coming in or out). It should be intended that two ports can also be present i.e. an inlet port and an outlet port without changing anything to the operation of the back-flush device.

The port 14 is provided to allow the filtrate coming from the cross flow filter device to fill through the diaphragm 19 the internal first part 21 of the expansion vessel 17 which is provided to contain the filtrate.

An additional valve 22 is provided in the second part 20 to allow excess of gas to go out to avoid the overpressure in the second part of the vessel.

As it can be seen at FIG. 3, and as mentioned before, when in service, the raw material is fed by the circulation pump 13 through the raw material inlet 4 into the space between the two filter elements 1,2. The fluid (liquid or gas) passes through the filter media of the filter elements 1,2 containing several particles which are smaller than the size of the filter media pores. Greater particles remain into the space between both filter elements 1,2. A portion of the particles will be deposited upon the surface of the filter media and the other portion will be carried out by the flow.

The fluid which has passed through the filter elements exits via the first 6 and the second filtrate outlet 7 and is either directed to another process plant, to a filtrate tank or to the back-flush device, depending on the valve positions. It should be considered that a filtrate tank and the back-flush device can be fed together by the filtration device according to the invention. The operation of the filtration device using the back-flush device is explained hereinafter in more details.

As it can be seen in FIG. 4b, the filtrate is fed in the first part 21 which increase in volume with filling. The filling with filtrate of this area results in a pressurisation of the second part 20 as the gas contained in the second part 20 is compressed by the increasing volume of the first part 21. Therefore, the second part 20 exerts also a pressure onto the diaphragm 19, which pressure is useful to clean one or both filter elements 1,2 when back-flush flow is required.

Figure 5:
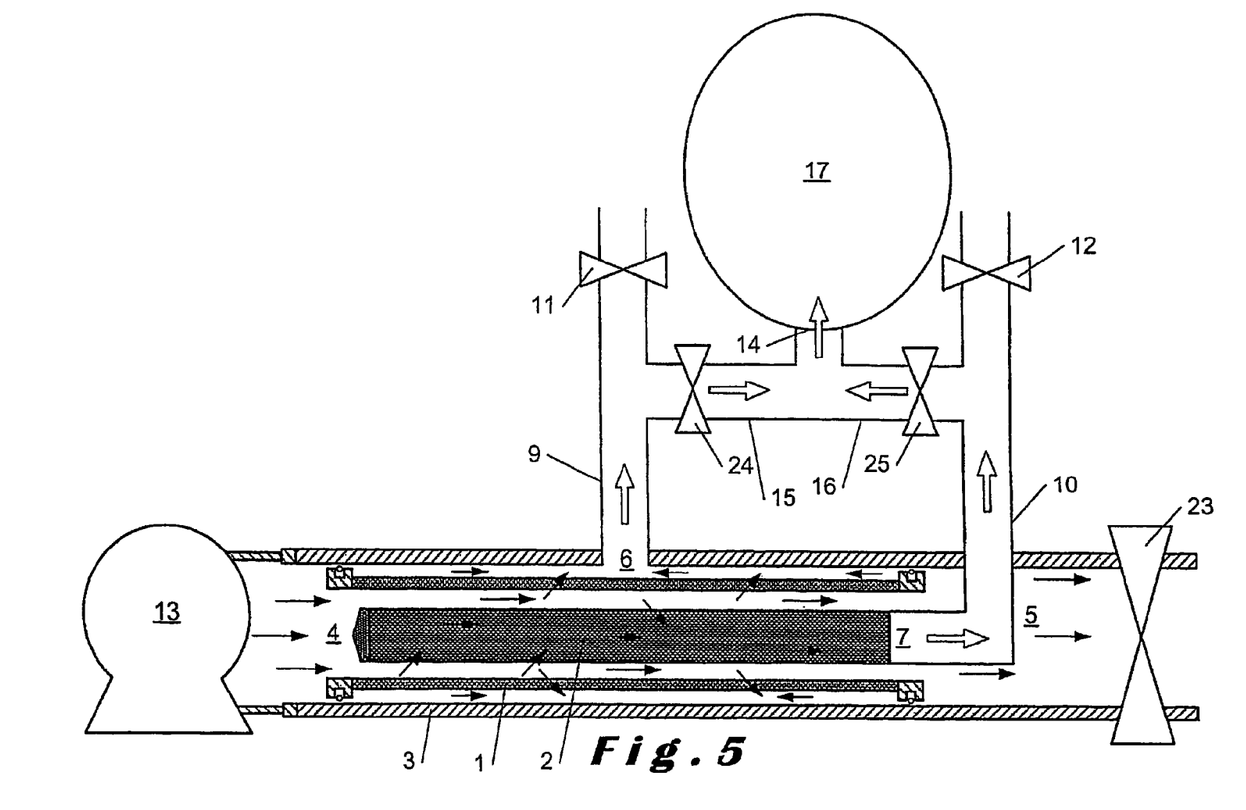
FIG. 5 is a cross section of the filtration device showing the filling and the pressurising of the expansion vessel with filtrate.

FIG. 5 shows several possibilities for the filling and the pressurising of the expansion vessel with filtrate. The direction of the filtrate flows is indicated by arrows in the different nozzles.

To build up pressure, the third 24 and the fourth 25 valves should be in open position and the first 11 and the second valves 12 should be in a closed position. Therefore, the expansion vessel 17 is pressurised using the filtrate flow. By throttling the throttle valve 23 of the concentrate outlet 4, the pressure of the filtrate flow is increased so that the pressure builds up in the filtration device.

This pressure will go through the filter elements 1, 2 to the filtrate side of the filtration device and thus, this pressure can be used to pressurise the expansion vessel 17 by filing it with the filtrate.

It should be understood that the expansion vessel 17 can be filled only with the filtrate coming from the first filter element 1, from the second filter element 2 or both.

The following table (Table 2) shows different possible configuration of the valves to fill the expansion vessel with filtrate while the arrows in FIG. 5 show the direction of the filtrate flows during these operations.

TABLE 2

|  | First valve (11) | Second valve (12) | Third valve (24) | Fourth valve (25) |
| --- | --- | --- | --- | --- |
| Fill via second filter element (2) | open | close | close | open |
| Fill via first filter element (1) | close | open | open | close |
| Fill via both filter element (1 and 2) | close | close | open | open |

Once the expansion vessel 17 has reached its maximal pressure, the third 24 and/or the fourth valves 25 are closed and the fifth valve 23 is opened by throttling to allow the concentrate outlet so that the cross flow effect comes back in the module.

Figure 6:
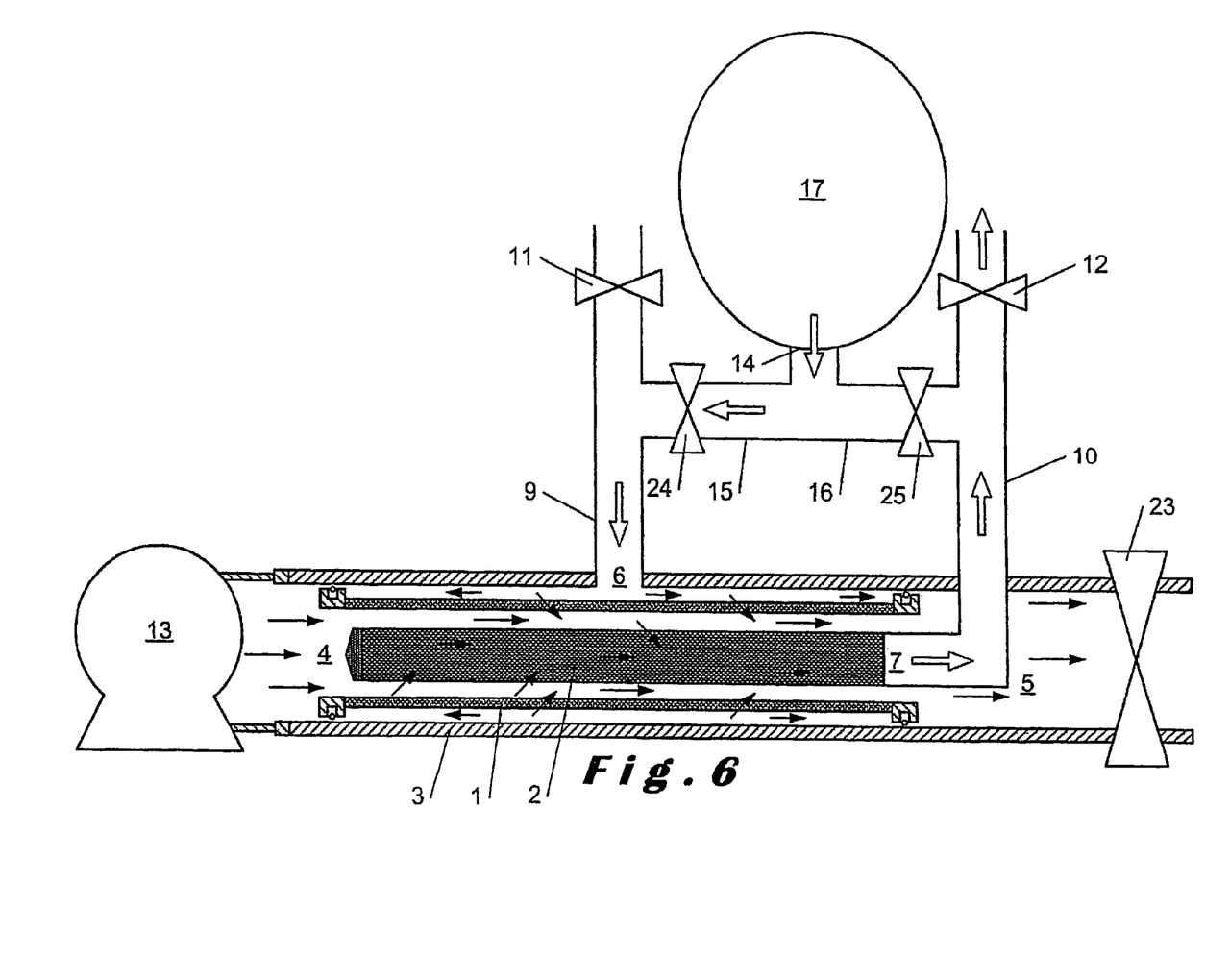
FIG. 6 is a cross section of the filtration device showing the back-flushing of the first filter element to remove deposition of particles while the second filter element is still in operation.

FIG. 6 shows the back-flushing of the first filter element 1 to remove deposition of particles while the second filter element 2 is still in operation.

For the following explanation, it should be envisaged that the expansion vessel 17 has reached its maximal pressure, and that the filtration device has been operated between the filling of the expansion vessel and the cleaning of the first filter element 1.

The following table (Table 3) shows the position of the valves when the first filter element 1 is back-flushed while the second filter element 2 is in operation. The direction of the filtrate during this operation is indicated by arrows in FIG. 6.

TABLE 3

|  | First valve (11) | Second valve (12) | Third valve (24) | Fourth valve (25) |
| --- | --- | --- | --- | --- |
| Back-Flush of the first filter element 1, second filter element 2 in operation | close | open | open | close |

Figure 7:
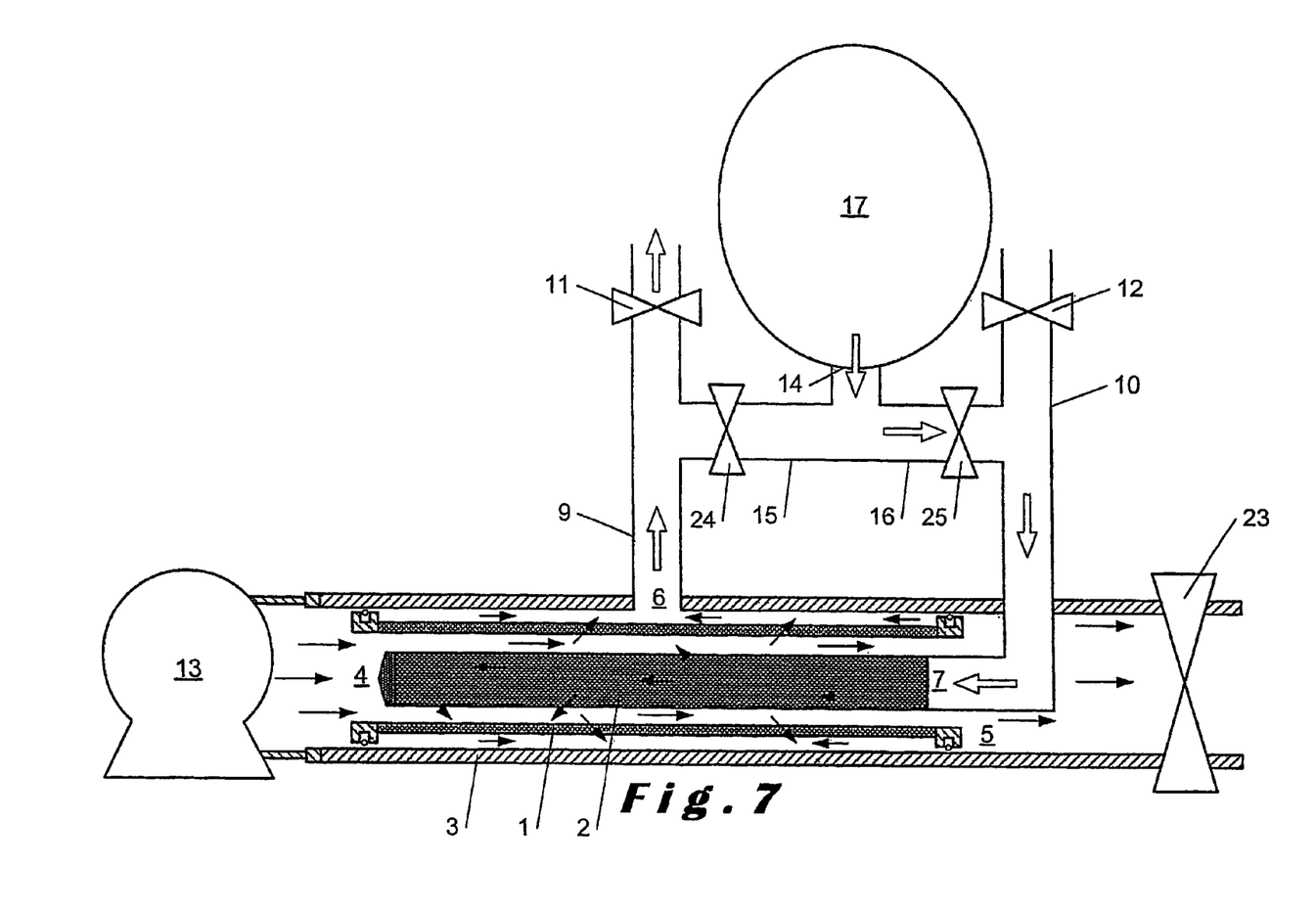
FIG. 7 is a cross section of the filtration device showing the back-flushing of the second filter element to remove deposition of particles while the first filter element is still in operation.

FIG. 7 shows the back-flushing of the second filter element 2 to remove deposition of particles while the first filter element 1 is still in operation.

The following table (Table 4) shows the position of the valves during the back-flushing of the second filter element 2 while the operation of the first filter element 1. The direction of the filtrate during this operation is indicated by arrows in FIG. 7.

TABLE 4

|  | First valve (11) | Second valve (12) | Third valve (24) | Fourth valve (25) |
| --- | --- | --- | --- | --- |
| Back-Flush of the second filter element 2, first | open | close | close | open |

TABLE 4-continued

|  | First valve (11) | Second valve (12) | Third valve (24) | Fourth valve (25) |
| --- | --- | --- | --- | --- |
| filter element 1 in operation |  |  |  |  |

Figure 8:
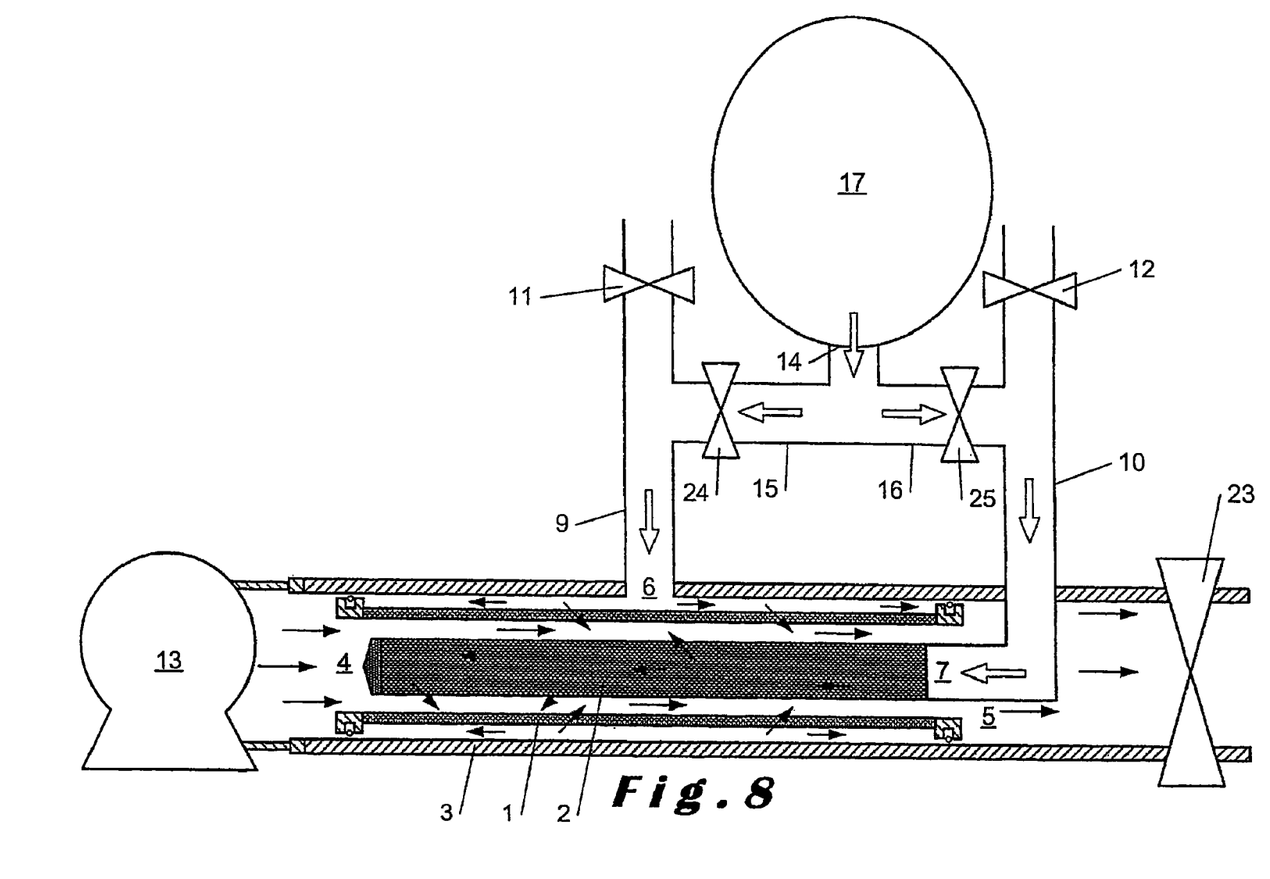
FIG. 8 is a cross section of the filtration device showing the back-flushing of the first and of the second filter elements to remove deposition of particles. Circulation of raw material is maintained to carry away the removed deposition into concentrate flow.

FIG. 8 shows the back-flushing of the first 1 and of the second filter element 2. Circulation of raw material is maintained to carry away the removed deposition into concentrate flow.

The following table (Table 5) shows the position of the valves during the back-flushing of the first 1 and of the second 2 filter element while circulation of the fluid in the space between the two filter element is maintained to carry away the removed particle into the concentrate flow. The direction of the filtrate during this operation is indicated by arrows in FIG. 8.

TABLE 5

|  | First valve (11) | Second valve (12) | Third valve (24) | Fourth valve (25) |
| --- | --- | --- | --- | --- |
| Back-Flush of the first 1 and of the second filter element 2 | close | close | open | open |

Although the preferred embodiments of the invention have been disclosed for illustrative purpose, those skilled in the art will appreciate that various modifications, additions or substitutions are possible, without departing from the scope and spirit of the invention as disclosed in the accompanying claims.

For example, the valves of the cross flow filter device according to the invention or of the back-flush device can be manually or automatically closed and opened.

The invention claimed is:

1. A method of increasing the filtrate output in cross-flow filtration, the method comprising:
   providing a cross-flow filter device having a housing in which a first longitudinal filter element and a second longitudinal filter element are arranged concentrically about a longitudinal axis thereof and defining a space between the first and second longitudinal filter elements, the first and second longitudinal filter elements ensuring the increased filtrate output;
   defining a raw material inlet in the cross-flow filter device for raw material to be filtered, the inlet being connected to the space between the first and second longitudinal filter elements;
   introducing the raw material into the raw material inlet; the raw material having a flow direction through the first longitudinal filter element from the space between the first and second longitudinal elements to the outside of the first longitudinal filter element and through the second longitudinal filter element from the space between the first and second longitudinal elements to the inside of the second longitudinal filter element;
   defining a concentrate outlet in the cross-flow filter device, the concentrate outlet being connected to the space between the first and second longitudinal filter elements;
   extracting a concentrate from the concentrate outlet of the cross-flow filter device, the concentrate comprising raw material that is substantially enriched in particles;

defining a first filtrate outlet in the cross-flow filter device, the first filtrate outlet being connected to the first longitudinal filter element;

extracting a first filtrate from the first longitudinal filter element of the cross-flow filter device, the first filtrate comprising a medium that is substantially depleted in particles;

defining a second filtrate outlet in the cross-flow filter device, the second filtrate outlet being connected to the second longitudinal filter element;

extracting a second filtrate from the second filter element of the cross-flow filter device, the second filtrate comprising a medium that is substantially depleted in particles; and wherein the flow of raw material and the flow of the first and second filtrates are substantially in the same direction through the cross-flow filter device.

2. A method of cross-flow filtration of a raw material comprising particles in a medium, the method comprising:

providing a cross-flow filter device having a housing in which a first longitudinal filter element and a second longitudinal filter element are arranged concentrically about a longitudinal axis thereof and defining a space between the first and second longitudinal filter elements;

providing the first and second longitudinal filter elements with respective first and second constant widths along the longitudinal axis, the space between the first and second longitudinal filter elements being defined as a ratio between the second constant width and the first constant width;

defining a raw material inlet in the cross-flow filter device for raw material to be filtered, the inlet being connected to the space between the first and second longitudinal filter elements;

introducing the raw material into the raw material inlet;

defining a concentrate outlet in the cross-flow filter device, the concentrate outlet being connected to the space between the first and second longitudinal filter elements;

extracting a concentrate from the concentrate outlet of the cross-flow filter device, the concentrate comprising raw material that is substantially enriched in particles;

defining a first filtrate outlet in the cross-flow filter device, the first filtrate outlet being connected to the first longitudinal filter element;

extracting a first filtrate from the first longitudinal filter element of the cross-flow filter device, the first filtrate comprising a medium that is substantially depleted in particles;

defining a second filtrate outlet in the cross-flow filter device, the second filtrate outlet being connected to the second longitudinal filter element;

extracting a second filtrate from the second filter element of the cross-flow filter device, the second filtrate comprising a medium that is substantially depleted in particles; and wherein the flow of raw material and the flow of the first and second filtrates are substantially in the same direction through the cross-flow filter device.

3. The method according to claim 2, further comprising aligning the raw material inlet with the concentrate outlet along the longitudinal axis, and providing a tangential flow without causing turbulence between the raw material inlet and the concentrate outlet.

4. The method according to claim 3, further comprising feeding the raw material to the inlet at a substantially constant flow rate.

5. The method according to claim 2, further comprising a step of increasing the velocity of the raw material by defining the ratio as at least 65%.

6. The method according to claim 5, wherein the ratio is at least 70%.

7. The method according to claim 5, wherein the ratio is at least 75%.

8. The method according to claim 2, further comprising the step of reducing clogging of the first and second longitudinal filter element by defining the ratio as at least 65%.

9. The method according to claim 8, wherein the ratio is defined as being at most 95%.

10. The method according to claim 8, wherein the ratio is at least 70%.

11. The method according to claim 8, wherein the ratio is at least 75%.

12. The method according to claim 2, further comprising providing the first and second longitudinal filter elements with respective first and second filter media, each filter media having its own cut-off.

13. The method according to claim 12, further comprising the step of collecting first and second filtrates from respective ones of the first and second longitudinal filter elements, the cut-off of the first filter media being substantially different to the cut-off of the second filter media.

14. The method according to claim 12, further comprising the step of collecting first and second filtrates from respective ones of the first and second longitudinal filter elements, the cut-off of the first filter media being substantially the same as the cut-off of the second filter media.

15. The method according to claim 12, further comprising selecting the filter media for each longitudinal filter element from the group comprising: metallic material, organic material and inorganic material.

16. The method according to claim 15, further comprising selecting the filter media for each longitudinal filter element from the group comprising: stainless steel, ceramics, polyethersulfone, and polypropylene.

17. A method of cross-flow filtration of a raw material comprising particles in a medium, the method comprising:

providing a cross-flow filter device having a housing in which a first longitudinal filter element and a second longitudinal filter element are arranged concentrically about a longitudinal axis thereof and defining a space between the first and second longitudinal filter elements;

defining a raw material inlet in the cross-flow filter device for raw material to be filtered, the inlet being connected to the space between the first and second longitudinal filter elements;

introducing the raw material into the raw material inlet;

defining a concentrate outlet in the cross-flow filter device, the concentrate outlet being connected to the space between the first and second longitudinal filter elements;

extracting a concentrate from the concentrate outlet of the cross-flow filter device, the concentrate comprising raw material that is substantially enriched in particles;

defining a first filtrate outlet in the cross-flow filter device, the first filtrate outlet being connected to the first longitudinal filter element;

extracting a first filtrate from the first longitudinal filter element of the cross-flow filter device, the first filtrate comprising a medium that is substantially depleted in particles;

defining a second filtrate outlet in the cross-flow filter device, the second filtrate outlet being connected to the second longitudinal filter element;

extracting a second filtrate from the second filter element of the cross-flow filter device, the second filtrate comprising a medium that is substantially depleted in particles;

back-flushing the cross-flow filter device whilst maintaining filtrate production by providing first and second nozzles, connecting the first and second nozzles to respective first and second filtrate outlets, providing first and second valves, and connecting the first and second valves to respective first and second nozzles, each valve having at least an open position and a closed position and being separately controlled; and wherein the flow of raw material and the flow of the first and second filtrates are substantially in the same direction through the cross-flow filter device.

18. The method according to claim 17, further comprising providing an expansion vessel having a first and second port, providing third and fourth nozzles, connecting the third nozzle to the first port of the expansion vessel and to the first nozzle, and connecting the fourth nozzle to the second port of the expansion vessel and to the second nozzle.

19. The method according to claim 18, further comprising providing third and fourth valves, and connecting the third and fourth valves to respective third and fourth nozzles, each valve having at least an open position and a closed position and is separately controlled.

20. The method according to claim 19, further comprising controlling the first, second, third and fourth valves to direct filtrate from the first and second filtrate outlets to one of a group comprising: a filtrate tank, the expansion tank and a process plant.

21. The method according to claim 18, further comprising filling the expansion vessel with filtrate to its maximal pressure and back-flushing one of the first and second longitudinal filter elements whilst maintaining the cross-flow filtering operation of the other longitudinal filter element by controlling the valves to direct filtrate from the expansion vessel to the longitudinal filter element being back-flushed.

22. The method according to claim 17, further comprising providing a fifth valve connected to the concentrate outlet.

23. The method according to claim 22, wherein the fifth valve comprises a throttle valve.

24. The method according to claim 23, further comprising throttling the throttle valve to regulate the flow of concentrate through the concentrate outlet.

* * * * *